United States Patent [19]
Rink et al.

[11] Patent Number: 5,503,939
[45] Date of Patent: Apr. 2, 1996

[54] PROCESS FOR THE PRODUCTION OF A TWO-COAT FINISH, AND AQUEOUS PAINTS SUITABLE FOR THIS PROCESS

[75] Inventors: Heinz P. Rink; Susanne Piontek, both of Münster; Bernhard Lettmann, Drensteinfurt, all of Germany; Stefan Wieditz, Sylvania, Ohio; Birgit Peitz, Münster, Germany; Achim Gast, Kamakura, Japan

[73] Assignee: BASF Lacke + Farben, AG, Muenster-Hiltrup, Germany

[21] Appl. No.: 338,465

[22] PCT Filed: May 13, 1993

[86] PCT No.: PCT/EP93/01196

§ 371 Date: Dec. 9, 1994

§ 102(e) Date: Dec. 9, 1994

[87] PCT Pub. No.: WO93/23177

PCT Pub. Date: Nov. 25, 1993

[30] Foreign Application Priority Data

May 20, 1992 [DE] Germany ............ 42 16 613.6

[51] Int. Cl.⁶ .................. B32B 15/08; B32B 25/16; B32B 27/08; B05D 1/36
[52] U.S. Cl. .................. 428/462; 428/463; 428/482; 428/522; 428/523; 427/407.1; 427/409; 427/417; 427/418; 526/213; 526/321; 526/329; 526/338; 526/340.1; 524/437; 524/457
[58] Field of Search .................. 427/407.1, 409, 427/417, 418; 428/462, 463, 482, 522, 523; 106/253; 524/437, 457; 526/321, 340.1, 329, 213, 338

[56] References Cited

U.S. PATENT DOCUMENTS

| | | | |
|---|---|---|---|
| 3,258,437 | 6/1966 | Peters et al. | 524/821 |
| 3,442,835 | 5/1969 | Curtice et al. | 106/252 |
| 3,935,140 | 1/1976 | Go et al. | 290/19 UA |
| 4,064,087 | 12/1977 | Das | 260/29.6 RB |
| 4,075,135 | 2/1978 | Jozwiak, Jr. et al. | 260/29.7 DP |
| 4,719,132 | 1/1988 | Porter, Jr. | 427/409 |
| 4,798,745 | 1/1989 | Martz et al. | 427/407.1 |
| 4,812,335 | 3/1989 | Kuwajima et al. | 427/407.1 |
| 5,011,733 | 4/1991 | Hiraki et al. | 427/410 |
| 5,169,884 | 12/1992 | Lindemann et al. | 524/44 |
| 5,322,715 | 6/1994 | Jouck et al. | 427/409 |

FOREIGN PATENT DOCUMENTS

| | | |
|---|---|---|
| 0038127 | 3/1981 | European Pat. Off. . |
| 0089497A2 | 2/1983 | European Pat. Off. . |
| 0107300A1 | 9/1983 | European Pat. Off. . |
| 0195931A1 | 2/1986 | European Pat. Off. . |
| 3628124A1 | 8/1986 | Germany . |
| 3915459A1 | 5/1988 | Germany . |
| 3841540A1 | 12/1988 | Germany . |
| 3942804A1 | 12/1989 | Germany . |

*Primary Examiner*—Diana Dudash

[57] ABSTRACT

The invention relates to a process for the production of two-coat finishes, in which a pigmented aqueous basecoat is applied, the basecoat obtained is coated over with a clearcoat, and basecoat and clearcoat are baked together. The process according to the invention is distinguished in that the aqueous basecoat contains an emulsion polymer which has been prepared in the presence of a reaction product (A), the reaction product (A) being obtained by reacting (i) a butadiene homo- or copolymer, (ii) at least one fatty acid of a drying oil or at least one drying oil or a mixture of at least one fatty acid of a drying oil and at least one drying oil, and (iii) maleic anhydride in a mass ratio of (i):(ii):(iii)=1.0:0.1 to 0.6:0.1 to 0.6 and, after adding a basic aqueous solution, converting the reaction product to an aqueous dispersion.

25 Claims, No Drawings

PROCESS FOR THE PRODUCTION OF A TWO-COAT FINISH, AND AQUEOUS PAINTS SUITABLE FOR THIS PROCESS

The invention relates to a process for the production of a two-coat finish on a substrate surface, in which
(1) a pigmented aqueous basecoat containing a water-dilutable emulsion polymer as binder is applied to the substrate surface,
(2) a polymer film is formed from the basecoat applied in stage (1),
(3) a transparent topcoat is applied to the basecoat thus obtained, and then
(4) basecoat and topcoat are baked together.

The invention also relates to aqueous paints suitable for this process.

The process described above for the production of two-coat finishes is known and is employed in particular in the production of topcoat finishes, especially in the production of metallic finishes on car bodies (cf. eg. DE-A-38 41 540, EP-A-287 144, DE-A-36 28 124, EP-A-195 931 and EP-A-256 549).

The visual impression of the two-coat finishes produced by the process under discussion is very heavily dependent on the spatial distribution and on the spatial orientation of the pigments contained in the basecoat. This is particularly true of metallic finishes. The higher the proportion of metallic pigment particles (especially aluminum pigment particles) present in flake form in the basecoat which are aligned parallel to the substrate surface, the greater the metallic effect. The spatial distribution and orientation of the pigments contained in the basecoat may be disturbed, in particular, after the application of the transparent topcoat and/or during the baking process.

The object on which the present invention is based consists in the provision of a process of the type described above with which two-coat finishes can be obtained whose visual impression, in particular the metallic effect, is improved in relation to the prior art.

This object is surprisingly achieved by employing in stage (1) of the process for the production of the two-coat finish a pigmented basecoat containing, as binder, an emulsion polymer which can be obtained by subjecting a mixture of
(a) 45 to 99% by weight, preferably 75 to 90% by weight, of a cycloaliphatic or aliphatic ester of methacrylic acid or acrylic acid which is free from hydroxyl, carboxyl and sulfonic acid groups, or of a mixture of such esters,
(b) 1 to 20% by weight, preferably 5 to 15% by weight, of an ethylenically unsaturated monomer which carries at least one hydroxyl group per molecule, or of a mixture of such monomers,
(c) 0 to 10% by weight, preferably 2 to 6% by weight, of an ethylenically unsaturated monomer which carries at least one carboxyl or at least one sulfonic acid group per molecule, or of a mixture of such monomers, and
(d) 0 to 25% by weight, preferably 2 to 15% by weight, of a further ethylenically unsaturated monomer which is different from (a), (b) and (c), or of a mixture of such monomers,
the sum of the proportions by weight of (a), (b), (c) and (d) always being 100% by weight, to free-radical polymerization in the aqueous phase in the presence of a reaction product (A) and of one or more emulsifiers, the reaction product (A) being obtainable by reacting
(i) a butadiene homo- or copolymer,
(ii) at least one fatty acid of a drying oil or at least one drying oil or a mixture of at least one fatty acid of a drying oil and at least one drying oil, and
(iii) maleic anhydride in a mass ratio of (i):(ii):(iii)=1.0:0.1 to 0.6:0.1 to 0.6 and, after adding a basic aqueous solution, converting the reaction product to an aqueous dispersion.

The emulsion polymer contained in the basecoat employed in accordance with the invention can be prepared by an emulsion polymerization which is known per se. In this case the monomer mixture comprising (a), (b), (c) and (d) is polymerized in an aqueous medium in the presence of one or more emulsifiers and of one or more free-radical initiators. What is essential to the invention is that this free-radical emulsion polymerization is carried out in the presence of the reaction product (A) described in more detail below.

The emulsion polymerization can be carried out by placing water, emulsifier and part of the initiator in a vessel and slowly adding the monomer mixture and, separately from the monomer mixture but in parallel therewith, the remainder of the initiator at the polymerization temperature (in general from 20° to 100° C., preferably from 40° to 90° C). It is also possible to place part of the water and the emulsifier in a vessel and slowly to add a pre-emulsion, prepared from the remainder of the water, the remainder of the emulsifier and the monomer mixture, and, separately from the pre-emulsion but in parallel therewith, the initiator at the reaction temperature. In this case it is preferred, on the one hand, initially to add part of the pre-emulsion (preferably about 30% by weight of the total amount of pre-emulsion to be employed) together with a corresponding partial amount of the initiator, to prepare a seed polymer and then to add the remainder of the pre-emulsion and the remainder of the initiator and to terminate the polymerization.

It is preferred to polymerize the monomer mixture in two stages (cf. DE-A-38 41 540). In a first stage of this procedure, a mixture of
(a1) 10 to 90% by weight, preferably 35 to 75% by weight, of the total amount of component (a) to be employed,
(b1) 0 to 90% by weight, preferably 0% by weight, of the total amount of component (b) to be employed,
(c1) 0 to 90% by weight, preferably 0% by weight, of the total amount of component (c) to be employed, and
(d1) 0 to 90% by weight, preferably 25 to 65% by weight, of the total amount of component (d) to be employed
is subjected to free-radical polymerization in the aqueous phase in the presence of the reaction product (A) and of one or more emulsifiers, and, after at least 80% by weight of the mixture comprising (a1), (b1), (c1) and (d1) have been reacted, in a second stage a mixture of
(a2) 90 to 10% by weight, preferably 75 to 35% by weight, of the total amount of component (a) to be employed,
(b2) 100 to 10% by weight, preferably 100% by weight, of the total amount of component (b) to be employed,
(c2) 100 to 10% by weight, preferably 100% by weight, of the total amount of component (c) to be employed, and
(d2) 100 to 10% by weight, preferably 65 to 25% by weight, of the total amount of component (d) to be employed
is subjected to free-radical polymerization in the aqueous phase in the presence of the polymer obtained in the first stage.

Preferred emulsion polymers are obtained when the monomer or monomer mixture employed in the first stage is selected such that, on complete polymerization of the monomer or monomer mixture employed in the first stage, a polymer having a glass transition temperature (TG1) of +30° C. to +110° C., preferably +60° C. to 95° C. is obtained and the monomer or monomer mixture employed in the second stage is selected such that the polymerization only of the monomer or monomer mixture employed in the second stage would lead to a polymer having a glass transition temperature (TG2) of −60° to +20° C. preferably −50° to 0° C. The selection of the monomers is not a problem for the person skilled in the art, since the glass transition temperature of emulsion polymers can be calculated approximately by the equation $$\frac{1}{T_G} = \sum_{n=1}^{n=x} \frac{W_n}{T_{Gn}}$$

in which
$T_G$=glass transition temperature of the copolymer in K,
$W_n$=proportion by weight of the nth monomer,
$T_{Gn}$=glass transition temperature of the homopolymer of the nth monomer, and
x=the number of different monomers.

In the preparation of emulsion polymers by the two-stage process, it is preferred in the first stage as described above to employ a pre-emulsion, and in the second stage to add the monomer mixture in bulk—that is, without water—and to add the initiator separately from the monomer mixture but in parallel therewith.

The quantitative ratio between the monomers and the water can be selected such that the resulting dispersion has a solids content of 30 to 60% by weight, preferably 35 to 50% by weight.

As emulsifier it is preferred to employ an anionic emulsifier, on its own or in a mixture.

Examples of anionic emulsifiers are the alkali metal salts of sulfuric acid half-esters of alkylphenols or alcohols, also the sulfuric acid half-esters of ethoxylated alkylphenols or ethoxylated alcohols, preferably the alkali metal salts or ammonium salts of the sulfuric acid half-ester of a nonylphenol reacted with 4–5 mol of ethylene oxide per mole, and an alkyl- or arylsulfonate, sodium lauryl sulfate, sodium lauryl ethoxylate-sulfate and secondary sodium alkanesulfonates with a carbon chain containing 8–20 carbon atoms. The amount of anionic emulsifier is from 0.1 to 5.0.% by weight, based on the monomers; preferably from 0.5–3.0% by weight. In addition, to increase the stability of the aqueous dispersions, a nonionic emulsifier of the type comprising an ethoxylated alkylphenol or fatty alcohol, for example an addition product of 1 mol of nonylphenol and 4–30 mol of ethylene oxide, can also be employed in a mixture with the anionic emulsifier.

The free-radical initiator employed is preferably a peroxide compound. The initiator is soluble in water or in monomer. A water-soluble initiator is preferably used.

Suitable initiators are the conventional inorganic percompounds, such as ammonium peroxodisulfate, potassium peroxodisulfate, ammonium or alkali metal peroxodisulfate [sic] and organic peroxides, for example benzoyl peroxide, organic per esters, such as perisopivalate, in some cases in combination with reducing agents such as sodium disulfite, hydrazine and hydroxylamine, and catalytic amounts of accelerators, such as iron, cobalt, cerium and vanadyl salts, but preferably alkali metal or ammonium peroxosulfates. The redox initiator systems disclosed in EP-A-107 300 can also be employed.

It is essential to the invention that the emulsion polymerization required for the preparation of the emulsion polymers contained in the basecoats employed in accordance with the invention is carried out in the presence of the reaction product (A).

The reaction product (A) can be obtained by reacting
(i) a butadiene homo- or copolymer,
(ii) at least one fatty acid of a drying oil or at least one drying oil or a mixture of at least one fatty acid of a drying oil and at least one drying oil, and
(iii) maleic anhydride
in a mass ratio of (i):(ii):(iii)=1.0:0.1 to 0.6:0.1 to 0.6, preferably 1.0:0.2 to 0.4:0.2 to 0.4, particularly preferably 1.0:0.2 to 0.3:0.2 to 0.3 and, after adding a basic aqueous solution, converting the reaction product to an aqueous dispersion.

The butadiene homo- or copolymer employed as component (i) has a number-average molecular weight of 500 to 8000, preferably 1000 to 3000. As component (i) it is preferred to employ a butadiene homopolymer. It is particularly preferred to employ as component (i) a butadiene homopolymer containing approximately 30 percent of 1,2 structures, 40 to 50 percent of 1,4-trans and 20 to 30 percent of 1,4-cis structures.

The butadiene copolymers which can be employed as component (i) can contain as comonomers alkyl methacrylates and alkyl acrylates having 1 to 12 carbon atoms in the alkyl radical, for example methyl acrylate, methyl methacrylate, ethyl acrylate, ethyl methacrylate, butyl acrylate and butyl methacrylate and also acrylonitrile, methacrylonitrile or styrene.

It is also possible to employ as component (i) butadiene homo- or copolymers containing functional groups, for example hydroxyl or carboxyl groups.

As component (ii), at least one fatty acid of a drying oil or at least one drying oil or a mixture of at least one fatty acid of a drying oil and at least one drying oil is employed. Examples of fatty acids of drying oils are oleic acid, linoleic acid, linolenic acid, oleostearic acid, ricinoleic acid and dehydrating ricinoleic acid. Synthetic mixtures of such fatty acids of drying oils can also be employed. A preferred mixture comprises oleic acid, linoleic acid and conjugated linoleic acid. Examples of drying oils are soybean oil, dehydrated castor oil, linseed oil, tung oil, safflower oil and sunflower oil.

Maleic anhydride is employed as component (iii).

The reaction of components (i), (ii) and (iii) is preferably carried out such that, in a first stage, components (i) and (ii) are reacted with one another at a temperature of 100° to 200° C., preferably 150° to 200° C., and subsequently, in a second stage—preferably using a solvent such as methyl isobutyl ketone—the product from the first stage is reacted preferably at 80° to 120° C. with maleic anhydride. The reaction with maleic anhydride can be catalyzed by, for example, phosphorous acid. Finally, after adding a basic aqueous solution (preferably a solution of ammonia or of one or more organic amines in water), the resulting reaction product is converted to an aqueous dispersion. After adding the basic aqueous solution the acid anhydride groups deriving from the maleic anhydride are hydrolyzed and converted, at least in part, to carboxylate groups. By this means the reaction product (A) prepared from (i), (ii) and (iii) can form a stable dispersion in water. The resulting aqueous dispersion can be employed in the preparation of the emulsion polymer as the initial charge. It can also be added to the initial charge comprising the water, emulsifier and initiator. It can also be added to the initial charge comprising the water, emulsifier and initiator [sic]. It is also possible to add the aqueous dispersion containing the reaction product (A) to the pre-emulsion consisting of water, emulsifier and monomers. The aqueous dispersion containing the reaction product (A) is employed in an amount such that the weight ratio of reaction product (A) to the total amount of monomers (a)+(b)+(c)+(d) employed is 0.01 to 0.3:1.0, preferably 0.01 to 0.1:1.0; in other words 0.01 to 0.3 part by weight, preferably 0.01 to 0.1 part by weight, of reaction product (A) is employed per part by weight of monomer.

The emulsion polymers contained in the paints employed in accordance with the invention are prepared using a monomer mixture comprising (a) 45 to 99% by weight, preferably 75 to 90% by weight, of a cycloaliphatic or aliphatic ester of methacrylic acid or acrylic acid which is free from hydroxyl, carboxyl and sulfonic acid groups, or of a mixture of such esters, (b) 1 to 20% by weight, preferably 5 to 15% by weight, of an ethylenically unsaturated monomer which carries at least one hydroxyl group per molecule, or of a mixture of such monomers, (c) 0 to 10% by weight, preferably 2 to 6% by weight, of an ethylenically unsaturated monomer which carries at least one carboxyl or at least one sulfonic acid group per molecule, or of a mixture of such monomers, and (d) 0 to 25% by weight, preferably 2 to 15% by weight, of a further ethylenically unsaturated monomer different from (a), (b) and (c), or of a mixture of such monomers, the sum of the proportions by weight of (a), (b), (c) and (d) always being 100% by weight.

Examples of compounds which can be employed as component (a) are cyclohexyl acrylate, cyclohexyl methacrylate, alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate, or mixtures of these monomers.

Examples of compounds which can be employed as component (b) are hydroxyalkyl esters of acrylic acid, methacrylic acid or of another α,β-ethylenically unsaturated carboxylic acid. These esters can derive from an alkylene glycol, which is esterified with the acid, or they can be obtained by reacting the acid with an alkylene oxide. As components (b) it is preferred to employ hydroxyalkyl esters of acrylic acid and methacrylic acid in which the hydroxyalkyl group contains up to 4 carbon atoms, or mixtures of these hydroxyalkyl esters. Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate. Corresponding esters of other unsaturated acids, for example ethacrylic acid, crotonic acid and similar acids having up to about 6 carbon atoms per molecule, can also be employed.

As components (c) it is preferred to employ acrylic acid and/or methacrylic acid and/or acrylamidomethylpropanesulfonic acid. However, it is also possible to employ other ethylenically unsaturated acids having up to 6 carbon atoms in the molecule. Examples of such acids are ethacrylic acid, crotonic acid, maleic acid, fumaric acid and itaconic acid.

Examples of compounds which can be employed as components (d) are vinyl-aromatic hydrocarbons, such as styrene, α-alkylstyrene and vinyltoluene, acrylamide and methacrylamide, acrylonitrile and methacrylonitrile, and furfuryl acrylate and furfuryl methacrylate. As components (d) it is preferred to employ furfuryl acrylate, furfuryl methacrylate, a mixture of furfuryl acrylate and furfuryl methacrylate or a mixture of furfuryl acrylate and/or furfuryl methacrylate and further ethylenically unsaturated monomers different from (a), (b) and (c).

Emulsion polymers which have been prepared using a component (d) containing a quantity of furfuryl acrylate and/or furfuryl methacrylate, preferably furfuryl methacrylate, such that the proportion of furfuryl acrylate and/or furfuryl methacrylate, based on the total amount of monomers employed, is from 0.25 to 10% by weight, preferably 1.0 to 9.0% by weight, particularly preferably 2.0 to 7.0% by weight, are particularly preferred. Using basecoats containing such emulsion polymers, it is possible to obtain two-coat finishes having a particularly good visual impression, especially a particularly good metallic effect.

The emulsion polymers contained in the basecoats employed in accordance with the invention should have a number-average molecular weight (determined by gel permeation chromatography using a polystyrene standard) of 200,000 to 2,000,000, preferably 300,000 to 1,500,000. The hydroxyl number of the emulsion polymers should preferably be between 2 and 100.

The person skilled in the art is familiar with how to choose the reaction conditions during the emulsion polymerization so as to obtain emulsion polymers which have the number-average molecular weights indicated above (cf. e.g. Chemie, Physik und Technologie der Kunststoffe in Einzeldarstellungen, Dispersionen synthetischer Hochpolymerer, Part 1 by F. Hölscher, Springer Verlag, Berlin, Heidelberg, New York, 1969).

In addition to the emulsion polymers described above, the basecoats employed in accordance with the invention can also contain further binder constituents, for example water-dilutable polyester resins, water-dilutable polyacrylate resins which have not been prepared in the above-described manner, water-dilutable polyurethane resins (cf. e.g. EP-A-89 497 and US-A-4,719,132), water-dilutable polyethers etc., and crosslinking agents such as amino resins, in particular melamine resins, and blocked polyisocyanates. Examples of these binder constituents and crosslinking agents are described in, for example, DE-A-38 41 540, EP-A-287 144, EP-A-38 127, EP-A-89 497, DE-A-36 28 124, EP-A-195931, US-A-4,719,132 and EP-A-256 540.

As pigments, the basecoats employed according to the invention may contain all those inorganic or organic pigments which are suitable for aqueous paints, or mixtures of such inorganic and/or organic pigments. Examples of pigments which can be employed are titanium dioxide, iron oxide, carbon black, metallic pigments, in particular aluminum pigments, and perlescent or interference pigments. The basecoats preferably contain metallic pigments, in particular aluminum pigments, alone or in combination with nonmetallic pigments.

The basecoats employed in accordance with the invention can additionally contain crosslinked polymer microparticles (cf. e.g. EP-A-38 127) and/or conventional rheology-controlling inorganic or organic additives. For instance, examples of effective thickeners are water-soluble cellulose ethers, such as hydroxyethylcellulose, methylcellulose or carboxymethylcellulose, and synthetic polymers containing ionic groups and/or groups having an associative effect, such as polyvinyl alcohol, poly(meth)acrylamide, poly(meth)acrylic acid, polyvinylpyrrolidone, styrene/maleic anhydride or ethylene/maleic anhydride copolymers and their derivatives, or else hydrophobically modified ethoxylated urethanes or polyacrylates. Particular preference is given to polyacrylate copolymers containing carboxyl groups, having an acid value of 60 to 780, preferably 200 to 500.

In stage (3) of the process according to the invention, in principle, all transparent topcoats (clearcoats) suitable for the production of two-coat finishes of the type under discussion can be employed. The transparent topcoats may be conventional varnishes, i.e. those containing exclusively organic solvents, or else aqueous finishes or powder coatings.

The invention is described in more detail in the following examples. All parts and percentages are by weight, unless expressly stated otherwise.

A) Preparation of an aqueous dispersion of an emulsion polymer according to DE-A 38 41 540 (cf. DE-A-38 41 540, page 8, emulsion polymer dispersion 1)

1344 g of deionized water and 12 g of a 30% strength aqueous solution of the ammonium salts of penta(ethylene glycol) nonylphenyl ether-sulfates (Fenopon® EP 110 from GAF Corp., emulsifier 1) are placed in a cylindrical jacketed glass vessel having a stirrer, reflux condenser, stirrable feed vessel, dropping funnel and thermometer and heated to 82° C. In the stirrable feed vessel an emulsion is prepared from 720 g of deionized water, 24 g of emulsifier 1, 10.8 g of acrylamide, 864 g of methyl methacrylate and 216 g of n-butyl methacrylate. 30% by weight of this emulsion are added to the initial charge. 28% by weight of a solution of 3.1 g of ammonium peroxodisulfate (ASP [sic]) in 188 g of deionized water are then added dropwise over 5 minutes. An exothermic reaction commences. The reaction mixture is maintained at between 82° and 88° C. 15 minutes after the end of the addition of the ammonium peroxodisulfate solution, the remaining 70% by weight of the emulsion together with the remaining 72% by weight of the ammonium peroxodisulfate solution are added over one hour, the temperature being maintained at 85° C. The batch is then cooled to 82° C. and, over 2 hours, a mixture of 842 g of n-butyl acrylate, 108 g of hydroxypropyl methacrylate, 43 g of methyl methacrylate, 43.2 g of methacrylic acid, 32.4 g of acrylamide and 5.4 g of eicosa(ethylene glycol) nonylphenyl ether (Antarox® CO 850 from GAF Corp., emulsifier 2) and 343 g of deionized water is added. After the end of the addition the reaction mixture is maintained for 1.5 hours at 85° C. The dispersion is then cooled and poured through a fabric with a mesh size of 30 µm. The finely particulate dispersion obtained has a nonvolatile content of 45% by weight, a pH of 3.4, an acid number of 13 and an OH number of 20.

B) Preparation of an aqueous dispersion of the reaction product (A)

721.5 g of Lithene P4-2000 (butadiene homopolymer, manufactured by Metallgesellschaft AG) and 180.4 g of coatings-grade linseed oil are placed in a steel vessel and heated to 220° C. As soon as the reaction mixture has reached a viscosity of 9.2 dPas, it is cooled to 105° C. Then 0.72 g of phosphorous acid, 28.4 g of methyl isobutyl ketone and 184.7 g of maleic anhydride are added. The mixture is then heated under reflux at 190° C. until the content-of free maleic anhydride is below 0.02% by weight. The resulting reaction product is dispersed with heating in a solution of 38.9 g of ammonia in 5354.4 g of water. The resulting dispersion is adjusted to a solids content of 17.5% by weight.

C) Preparation of an aqueous dispersion of an emulsion polymer according to the present invention The procedure as described under A) is followed, the only difference being that the emulsion prepared in the stirrable feed vessel is prepared using 802 g of methyl methacrylate (instead of 864 g) and 62 g of the dispersion prepared according to B).

D) Preparation of an aqueous dispersion of an emulsion polymer according to the present invention using furfuryl methacrylate The procedure as described under C) is followed, the only difference being that in the second stage, instead of 842 g of n-butyl acrylate, 792 g of n-butyl acrylate and 5.0 g of furfuryl methacrylate (FMA, Röhm GmbH, CAS 3454-28-2) are employed.

E) Preparation of an aqueous basecoat using the polyacrylate resin according to A)

16.4 g of butyl glycol, 3.4 g of a commercial melamine/formaldehyde resin (Cymel® 301), 2.9 g of polypropylene glycol (number-average molecular weight=420) and 6.6 g of an aluminum bronze according to DE-A-36 36 183 (aluminum content: 65% by weight) are stirred using a high-speed stirrer for 15 minutes (300–500 rpm). A mixture 1 is obtained.

33.5 g of the dispersion prepared as in A) are mixed with 20.3 g of deionized water, and adjusted to a pH of 7.7 with a 5% strength aqueous solution of dimethylethanolamine. The mixture is stirred for 10 minutes and then 17.0 g of a 3.5% strength solution of a commercially available polyacrylic acid thickener (Viscalex® HV/30 from Allied Colloids, pH: 8.0), and the mixture is stirred for a further 10 minutes. The mixture 2 is obtained.

Mixtures 1 and 2 are mixed for 30 minutes at 800–1000 rpm. The resulting basecoat is adjusted to a pH of 7.7 with a 5% strength aqueous solution of dimethylethanolamine and with deionized water to a solids content of 20% by weight.

F) Preparation of basecoats according to the invention

The procedure described under E) is followed. Instead of the dispersion prepared as in A), the dispersions prepared as in C) and D) are employed.

G) Production of two-coat finishes

The basecoats prepared as in E) and F) are sprayed in a known manner onto phosphatized steel panels (Bonder 132) coated with a commercial electrode-position coating and a commercial filler, coated over after a flashoff time of 10 minutes at 80° C. with a commercial clearcoat and baked for 20 minutes at 140° C. A reference value of 65 is determined for the metallic effect of the two-coat finish produced using the basecoat prepared as in E) and, for the metallic effect of the two-coat finishes produced using the basecoats prepared as in F), reference values of 70 (paint containing dispersion according to C)) and 76 (paint containing dispersion according to D)) respectively are obtained.

The reference values for the metallic effect are determined as follows:

1. Measurement of the spectral reflection using a Datacolor/Zeiss MCS 211/MMK 111 goniospectrophotometer under the following geometrical conditions

| Geometry class | Illumination | Observation |
| --- | --- | --- |
| 25° | 45° | −20° |
| 70° | 45° | 25° |

2. Determination of the CIEL*a*b* 1976 color coordinates according to DIN 5033 and DIN 6174 for the standard observer at 10° under standard lighting $D_{65}$.

3. Determination of the reference value for the metallic effect according to the relationship: reference value= $((L_{25°}-L_{70°}) 50):L_{70°}$.

We claim:

1. Process for the production of a two-coat finish on a substrate surface, comprising the steps of (1) applying a pigmented aqueous basecoat containing a water-dilutable emulsion polymer as binder to the substrate surface, (2) forming a polymer film from the basecoat applied in stage (1), (3) applying a transparent topcoat to the basecoat thus obtained, and then (4) baking the basecoat and topcoat together, characterized in that the emulsion polymer contained in the basecoat is obtained by subjecting a mixture of (a) 45 to 99% by weight of a cycloaliphatic or aliphatic ester of methacrylic acid or acrylic acid which is free from hydroxyl, carboxyl and sulfonic acid groups, or of a mixture of such esters, (b) 1 to 20% by weight of an ethylenically unsaturated monomer which carries at least one hydroxyl group per molecule, or of a mixture of such monomers, (c) 0 to 10% by weight of an ethylenically unsaturated monomer which carries at least one carboxyl or at least one sulfonic acid group per molecule, or of a mixture of such monomers, and (d) 0 to 25% by weight of a further ethylenically unsaturated monomer which is different from (a), (b) and (c), or of a mixture of such monomers, the sum of the proportions by weight of (a), (b), (c) and (d) always being 100% by weight, to free-radical polymerization in the aqueous phase in the presence of a reaction product (A) and of one or more emulsifiers, wherein the reaction product (A) is obtained by reacting (i) a butadiene homo- or copolymer, (ii) at least one compound selected from the group consisting of fatty acid of a drying oil, at least one drying oil, and mixtures thereof, and (iii) maleic anhydride in a mass ratio of (i):(ii):(iii)=1.0:0.1 to 0.6:0.1 to 0.6 and, after adding a basic aqueous solution, converting the reaction product to an aqueous dispersion.

2. Aqueous paints containing an emulsion polymer as binder, characterized in that the emulsion polymer is obtained by subjecting a mixture of (a) 45 to 99% by weight of a cycloaliphatic or aliphatic ester of methacrylic acid or acrylic acid which is free from hydroxyl, carboxyl and sulfonic acid groups, or of a mixture of such esters, (b) 1 to 20% by weight of an ethylenically unsaturated monomer which carries at least one hydroxyl group per molecule, or of a mixture of such monomers, (c) 0 to 10% by weight of an ethylenically unsaturated monomer which carries at least one carboxyl or at least one sulfonic acid group per molecule, or of a mixture of such monomers, and (d) 0 to 25% by weight of a further ethylenically unsaturated monomer which is different from (a), (b) and (c), or of a mixture of such monomers, the sum of the proportions by weight of (a), (b), (c) and (d) always being 100% by weight, to free-radical polymerization in the aqueous phase in the presence of a reaction product (A) and of one or more emulsifiers, the reaction product (A) being obtained by reacting (i) a butadiene homo- or copolymer, (ii) a compound selected from the group consisting of at least one fatty acid of a drying oil, at least one drying oil and mixtures thereof, and (iii) maleic anhydride in a mass ratio of (i):(ii):(iii)=1.0:0.1 to 0.6:0.1 to 0.6 and, after adding a basic aqueous solution, converting the reaction product to an aqueous dispersion.

3. Process according to claim 1, characterized in that the basecoat applied in stage (i) contains a metallic pigment.

4. Process according to claim 1, characterized in that, component (d) is selected from the group consisting of furfuryl acrylate, furfuryl methacrylate and mixtures thereof and further ethylenically unsaturated monomers different from (a), (b) and (c) are employed.

5. Process according to claim 1, characterized in that the emulsion polymer has a number-average molecular weight of 200,000 to 2,000,000 and a hydroxyl number of 2 to 100.

6. Process according to claim 1, characterized in that the emulsion polymer is obtained by subjecting in a first stage a mixture of (a1) 10 to 90% by weight of the total amount of component (a) to be employed, (b1) 0 to 90% by weight of the total amount of component (b) to be employed, (c1) 0 to 90% by weight of the total amount of component (c) to be employed, and (d1) 0 to 90% by weight of the total amount of component (d) to be employed to free-radical polymerization in the aqueous phase in the presence of the reaction product (A) and of one or more emulsifiers, and, after at least 80% by weight of the mixture comprising (a1), (b1), (c1) and (d1) have been reacted, subjecting in a second stage a mixture of (a2) 90 to 10% by weight of the total amount of component (a) to be employed, (b2) 100 to 10% by weight of the total amount of component (b) to be employed, (c2) 100 to 10% by weight of the total amount of component (c) to be employed, and (d2) 100 to 10% by weight of the total amount of component (d) to be employed to free-radical polymerization in the aqueous phase in the presence of the polymer obtained in the first stage.

7. Process according to claim 1, characterized in that, as component (i) a butadiene homopolymer having a number-average molecular weight of 500 to 8000, preferably 1000 to 3000, is employed.

8. Process according to claim 1, characterized in that components (i), (ii) and (iii) are reacted in a mass ratio of (i):(ii):(iii)=1.0:0.2 to 0.4:0.2 to 0.4.

9. Process according to claim 1, characterized in that the weight ratio of reaction product (A) to the total amount of monomers (a)+(b)+(c)+(d) employed is 0.01 to 0.3:1.0.

10. A process according to claim 1, wherein the emulsion polymer is obtained by subjecting in a first stage a mixture of (a1) 35 to 75% by weight, of the total amount of component (a) to be employed, (b1) 0% by weight of the total amount of component (b) to be employed, (c1) 0% by weight of the total amount of component (c) to be employed, and (d1) 25 to 65% by weight of the total amount of component (d) to be employed to free-radical polymerization in the aqueous phase in the presence of the reaction product (A) and of one or more emulsifiers, and, after at least 80% by weight of the mixture comprising (a1), (b1), (c1) and (d1) have been reacted, subjecting in a second stage a mixture of (a2) 75 to 35% by weight of the total amount of component (a) to be employed, (b2) 100% by weight of the total amount of component (b) to be employed, (c2) 100% by weight of the total amount of component (c) to be employed, and (d2) 65 to 25% by weight of the total amount of component (d) to be employed to free-radical polymerization in the aqueous phase in the presence of the polymer obtained in the first stage.

11. Process according to claim 1, characterized in that, as component (i) a butadiene homopolymer having a number-average molecular weight of 1000 to 3000, is employed.

12. Process according to claim 1, characterized in that components (i), (ii) and (iii) are reacted in a mass ratio of 1.0:0.2 to 0.3:0.2 to 0.3.

13. Process according to claim 1, characterized in that the weight ratio of reaction product (A) to the total amount of monomers (a)+(b)+(c)+(d) employed is 0.01 to 0.1:1.0.

14. An aqueous paint comprising an emulsion polymer according to claim 2, wherein the emulsion polymer is obtained by subjecting a mixture of
- (a) 45 to 99% by weight of a cycloaliphatic or aliphatic ester of methacrylic acid or acrylic acid which is free from hydroxyl, carboxyl and sulfonic acid groups, or of a mixture of such esters,
- (b) 1 to 20% by weight of an ethylenically unsaturated monomer which carries at least one hydroxyl group per molecule, or of a mixture of such monomers,
- (c) 0 to 10% by weight of an ethylenically unsaturated monomer which carries at least one carboxyl or at least one sulfonic acid group per molecule, or of a mixture of such monomers, and
- (d) 0 to 25% by weight of a further ethylenically unsaturated monomer which is different from (a), (b) and (c), or of a mixture of such monomers, the sum of the proportions by weight of (a), (b), (c) and (d) always being 100% by weight, to free-radical polymerization in the aqueous phase in the presence of a reaction product (A) and of one or more emulsifiers, wherein the reaction product (A) is obtained by reacting
- (i) a butadiene homo- or copolymer,
- (ii) at least one compound selected from the group consisting of fatty acid of a drying oil, at least one drying oil, and mixtures thereof, and
- (iii) maleic anhydride in a mass ratio of (i):(ii):(iii)=1.0:0.1 to 0.6:0.1 to 0.6 and, after adding a basic aqueous solution, converting the reaction product to an aqueous dispersion.

15. An aqueous paint comprising an emulsion polymer according to claim 2, wherein component (d) is selected from the group consisting of furfuryl acrylate, furfuryl methacrylate and mixtures thereof and further ethylenically unsaturated monomers different from (a), (b) and (c) is employed.

16. An aqueous paint comprising an emulsion polymer according to claim 2, characterized in that the emulsion polymer has a number-average molecular weight of 200,000 to 2,000,000 and a hydroxyl number of 2 to 100.

17. An aqueous paint comprising an emulsion polymer according to claim 2, characterized in that the emulsion polymer is obtained by subjecting in a first stage a mixture of
- (a1) 10 to 90% by weight of the total amount of component (a) to be employed,
- (b1) 0 to 90% by weight of the total amount of component (b) to be employed,
- (c1) 0 to 90% by weight of the total amount of component (c) to be employed, and
- (d1) 0 to 90% by weight of the total amount of component (d) to be employed to free-radical polymerization in the aqueous phase in the presence of the reaction product (A) and of one or more emulsifiers, and, after at least 80% by weight of the mixture comprising (a1), (b1), (c1) and (d1) have been reacted, subjecting in a second stage a mixture of
- (a2) 90 to 10% by weight of the total amount of component (a) to be employed,
- (b2) 100 to 10% by weight of the total amount of component (b) to be employed,
- (c2) 100 to 10% by weight of the total amount of component (c) to be employed, and
- (d2) 100 to 10% by weight of the total amount of component (d) to be employed to free-radical polymerization in the aqueous phase in the presence of the polymer obtained in the first stage.

18. An aqueous paint comprising an emulsion polymer according to claim 2, characterized in that, as component (i) a butadiene homopolymer having a number-average molecular weight of 500 to 8000 is employed.

19. An aqueous paint comprising an emulsion polymer according to claim 2, characterized in that components (i), (ii) and (iii) are reacted in a mass ratio of (i):(ii):(iii)=1.0:0.2 to 0.4:0.2 to 0.4.

20. An aqueous paint comprising an emulsion polymer according to claim 2, characterized in that the weight ratio of reaction product (A) to the total amount of monomers (a)+(b)+(c)+(d) employed is 0.01 to 0.3:1.0.

21. An aqueous paint comprising an emulsion polymer according to claim 2, wherein the emulsion polymer is obtained by subjecting in a first stage a mixture of
- (a1) 35 to 75% by weight, of the total amount of component (a) to be employed,
- (b1) 0% by weight of the total amount of component (b) to be employed,
- (c1) 0% by weight of the total amount of component (c) to be employed, and
- (d1) 25 to 65% by weight of the total amount of component (d) to be employed to free-radical polymerization in the aqueous phase in the presence of the reaction product (A) and of one or more emulsifiers, and, after at least 80% by weight of the mixture comprising (a1), (b1), (c1) and (d1) have been reacted, subjecting in a second stage a mixture of
- (a2) 75 to 35% by weight of the total amount of component (a) to be employed,
- (b2) 100% by weight of the total amount of component (b) to be employed,
- (c2) 100% by weight of the total amount of component (c) to be employed, and
- (d2) 65 to 25% by weight of the total amount of component (d) to be employed to free-radical polymerization in the aqueous phase in the presence of the polymer obtained in the first stage.

22. An aqueous paint comprising an emulsion polymer according to claim 2, characterized in that, as component (i) a butadiene homopolymer having a number-average molecular weight of 1000 to 3000, is employed.

23. An aqueous paint comprising an emulsion polymer according to claim 2, characterized in that components (i), (ii) and (iii) are reacted in a mass ratio of 1.0:0.2 to 0.3:0.2 to 0.3.

24. An aqueous paint comprising an emulsion polymer according to claim 2, characterized in that the weight ratio of reaction product (A) to the total amount of monomers (a)+(b)+(c)+(d) employed is 0.01 to 0.1:1.0.

25. A coated article comprising a multilayer coating comprising as a basecoat layer an aqueous paint comprising an emulsion polymer according to claim 2, and a transparent topcoat layer over the basecoat layer.

* * * * *